United States Patent
Kim et al.

(10) Patent No.: US 6,864,935 B2
(45) Date of Patent: Mar. 8, 2005

(54) LIQUID CRYSTAL DISPLAY

(75) Inventors: Il-Gon Kim, Suwon-si (KR); You-Lee Song, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/787,370

(22) Filed: Feb. 26, 2004

(65) Prior Publication Data

US 2004/0169780 A1 Sep. 2, 2004

(30) Foreign Application Priority Data

Feb. 27, 2003 (KR) .................................. 10-2003-0012386

(51) Int. Cl.[7] .................................................. G02P 1/13
(52) U.S. Cl. ..................................... 349/129; 349/130
(58) Field of Search ................................. 349/129, 130

(56) References Cited

U.S. PATENT DOCUMENTS 6,567,144 B1 * 5/2003 Kim et al. .................. 349/128
6,573,964 B1 * 6/2003 Takizawa et al. ........... 349/129
6,614,497 B2 * 9/2003 Yamada ....................... 349/129
6,657,695 B1 * 12/2003 Song et al. .................. 349/143
6,671,020 B2 * 12/2003 Kim et al. ................... 349/129
6,741,314 B2 * 5/2004 Song .......................... 349/144

* cited by examiner

Primary Examiner—James A. Dudek
(74) Attorney, Agent, or Firm—F. Chau & Associates, LLC

(57) ABSTRACT

A liquid crystal display includes a pixel electrode, a common electrode facing the pixel electrode, and a thin film transistor including a gate electrode connected to a gate line, a source electrode connected to a data line, and a drain electrode connected to the pixel electrode. First and second domain defining members defining domains are provided at the liquid crystal display and the drain electrode is disposed near a corner of one of the domains. The drain electrode has an edge extending perpendicular to major edges of the domains and located closest to a center of the one of the domains.

5 Claims, 3 Drawing Sheets

LIQUID CRYSTAL DISPLAY

BACKGROUND OF THE INVENTION (a) Field of the Invention

The present invention relates to a liquid crystal display.

(b) Description of the Related Art

An LCD includes two panels provided with field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

Among the LCDs, a vertically aligned mode LCD (referred to as a "VALCD" hereinafter), which aligns the major axes of the LC molecules vertical to upper and lower panels in absence of electric field, is promising because of its high contrast ratio and wide viewing angle. To implement wide viewing angle in the VALCD, a cutout pattern or protuberances are provided on the electrode. Both distribute tilt directions of the LC molecules into several directions, thereby giving wide viewing angle.

A region of the LC layer where the LC molecules have substantially the same orientations is called a domain, and the orientations of the LC molecules are disordered near corners of the domains to generate light leakage or texture.

The LCD also includes a plurality of thin film transistors for applying voltages to the pixel electrodes and each transistor includes a source electrode, a drain electrode, and a gate electrode. The drain electrodes that are normally made of opaque material are connected to the pixel electrodes and overlap the pixel electrode to reduce the aperture ratio of the LCD.

SUMMARY OF THE INVENTION

A liquid crystal display is provided, which includes: a first substrate; a gate line formed on the first substrate; a data line formed on the first substrate and intersecting the gate line; a pixel electrode disposed substantially in an area defined by the gate line and the data line; a thin film transistor including a gate electrode connected to the gate line, a source electrode connected to the data line, and a drain electrode connected to the pixel electrode; a second substrate facing the second substrate; a common electrode formed on the second substrate; a liquid crystal layer interposed between the first substrate and the second substrate; first and second domain defining members defining a plurality of domains in the liquid crystal layer, wherein the drain electrode is disposed near a corner of one of the domains.

Each domain preferably has a pair of major edges extending parallel to each other.

The major edges of the domains preferably make an angle of about 45 degrees with the gate line.

The drain electrode may have a plurality of edges and the edges of the drain electrode include a first edge extending perpendicular to the major edges of the domains and located closest to a center of the one of the domains.

The first and the second domain defining members may include cutouts provided in the pixel electrode and the common electrode.

The liquid crystal display may further include a storage electrode overlapping the first domain defining member.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
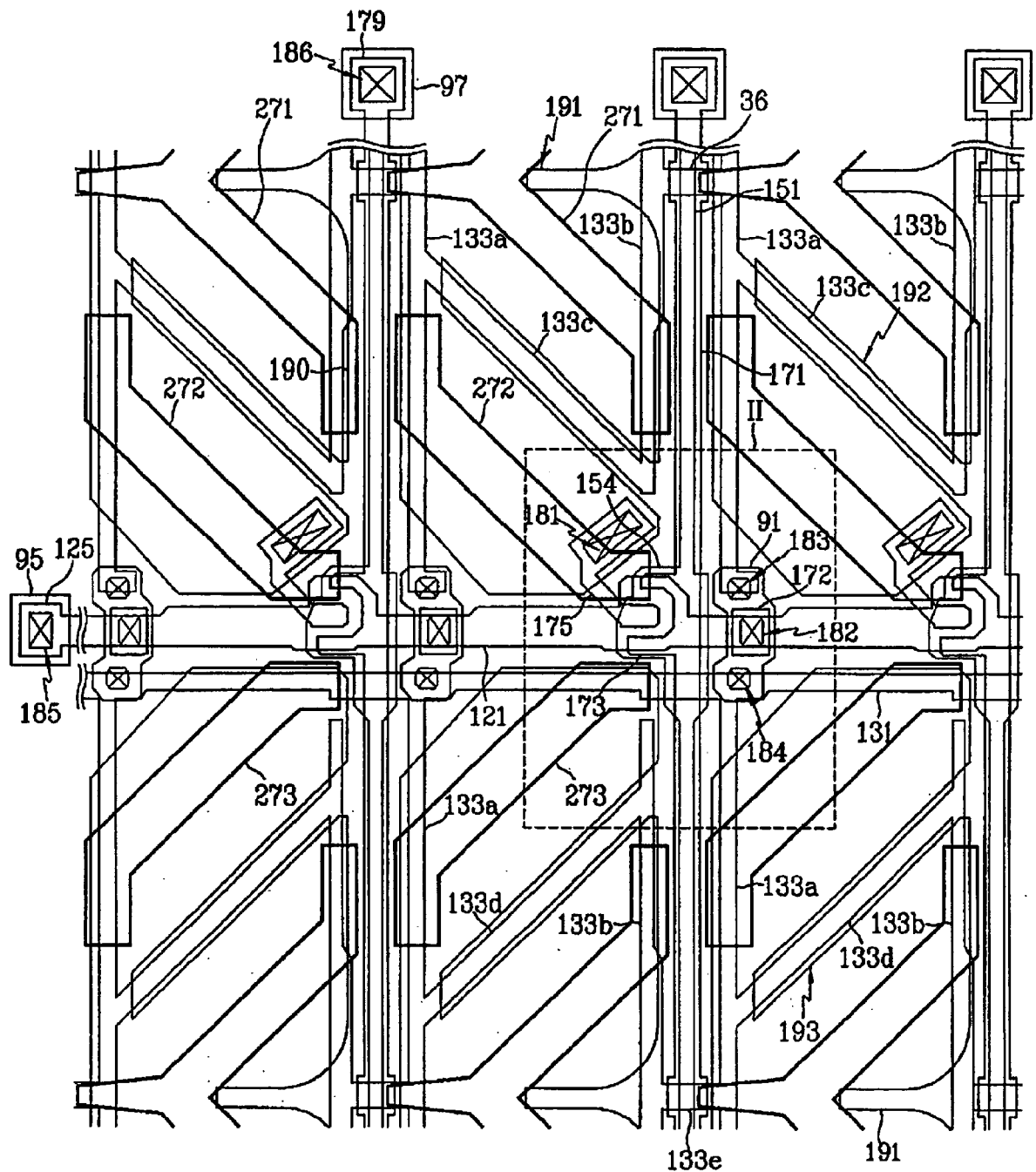
FIG. 1 is a layout view of a TFT array panel of an LCD according to an embodiment of the present invention.

The present invention now will be described more fully hereinafter with reference to the accompanying drawings, in which embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, liquid crystal displays according to embodiments of the present invention will be described with reference to the accompanying drawings.

Figure 2:
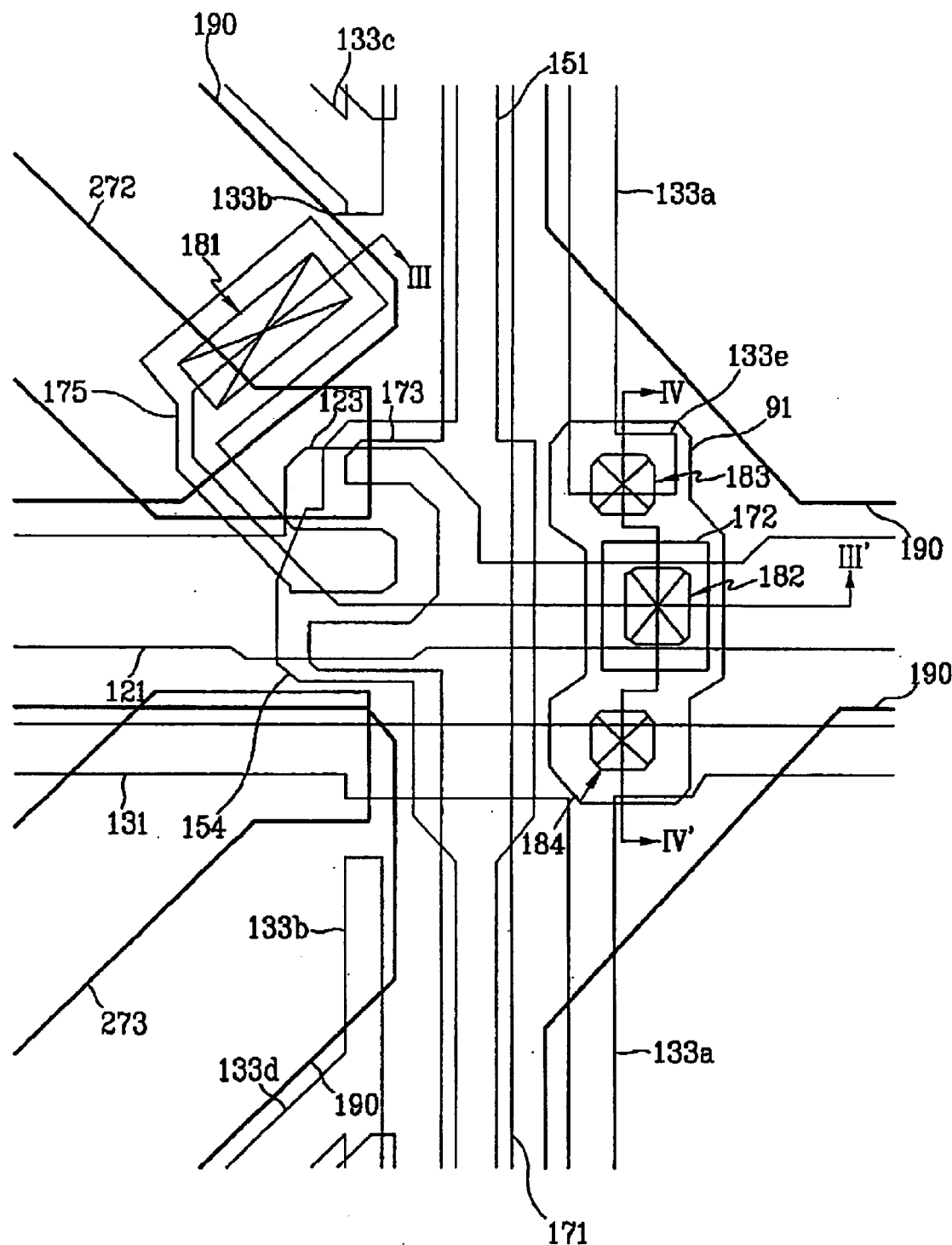
FIG. 2 is a partially enlarged view of the LCD shown in FIG. 1.
Figure 3:
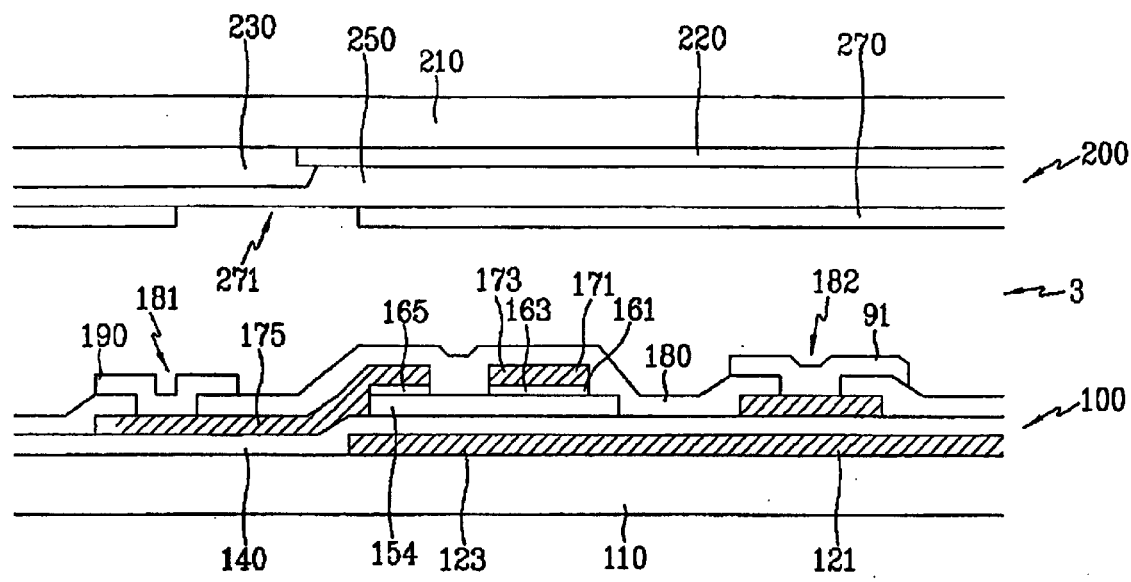
FIG. 3 is a sectional view of the LCD shown in FIG. 2 taken along the line III–III'.
Figure 4:
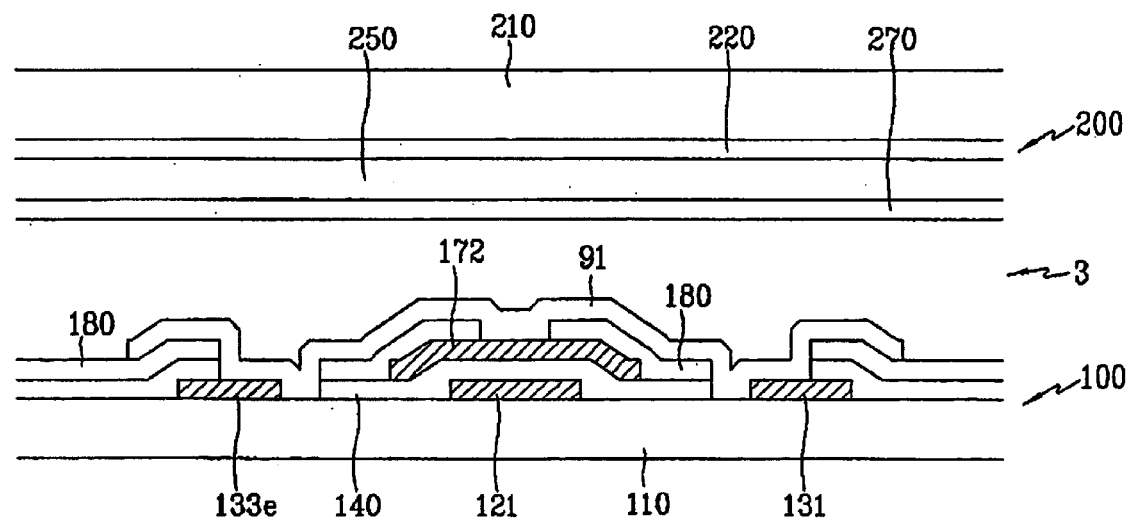
FIG. 4 is a sectional view of the LCD shown in FIG. 2 taken along the line IV–IV'.

FIG. 1 is a layout view of a TFT array panel of an LCD according to an embodiment of the present invention, FIG. 2 is a partially enlarged view of the LCD shown in FIG. 1 taken along the line II–II', FIG. 3 is a sectional view of the LCD shown in FIG. 2 taken along the line III–III', and FIG. 4 is a sectional view of the LCD shown in FIG. 2 taken along the line IV–IV'.

An LCD according to an embodiment of the present invention includes a TFT array panel 100, a common electrode panel 200, and a LC layer 3 interposed between the panels 100 and 200 and containing a plurality of LC molecules aligned vertical to surfaces of the panels 100 and 200.

The TFT array panel 100 is now described in detail.

A plurality of gate lines 121 and a plurality of storage electrode lines 131 are formed on an insulating substrate 110.

The gate lines 121 extend substantially in a transverse direction and they are separated from each other and transmit gate signals. Each gate line 121 includes a plurality of projections forming a plurality of gate electrodes 123 and an end portion having a larger width for connection with an external driving circuit.

Each storage electrode line 131 extends substantially in the transverse direction and includes a plurality of sets of two longitudinal branches forming first and second storage electrodes 133a and 133b and two oblique branches forming third and fourth storage electrode 133c and 133d connected between the first storage electrode 133a and the second storage electrode 133b, and a plurality of electrode connections 133e connecting the second storage electrodes 133b and the first storage electrodes 133a in adjacent sets of the branches 133a–133d. Each of the first storage electrodes 133a has a free curved end portion and a fixed end portion connected to the storage electrode line 131. Each of the third and the fourth storage electrodes 133c and 133d is connected to the second storage electrode 133b at an end portion of the second storage electrode 133b and to the first storage electrode 133a at a middle point of the first storage electrode 133a. The third and the fourth storage electrodes 133c and 133d extend in directions making an angle of about 90 degrees, for example, the third storage electrode 133c extends from the middle point of the first storage electrode 133a to a lower end of the second storage electrode 133b, while the third storage electrode 133d extends from the middle point of the first storage electrode 133a to an upper end of the second storage electrode 133b. The storage electrode lines 131 are supplied with a predetermined voltage such as a common voltage, which is applied to a common electrode 270 on the other panel 200 of the LCD.

The gate lines 121 and the storage electrode lines 131 is preferably made of Al containing metal such as Al and Al alloy, Ag containing metal such as Ag and Ag alloy, Cu containing metal such as Cu and Cu alloy, Mo containing metal such as Mo and Mo alloy, Cr, Ti or Ta. The gate lines 121 and the storage electrode lines 131 may have a multi-layered structure including two films having different physical characteristics, a lower film (not shown) and an upper film (not shown). The upper film is preferably made of low resistivity metal including Al containing metal such as Al and Al alloy for reducing signal delay or voltage drop in the gate lines 121 and the storage electrode lines 131. On the other hand, the lower film is preferably made of material such as Cr, Mo and Mo alloy, which has good contact characteristics with other materials such as indium tin oxide (ITO) or indium zinc oxide (IZO). A good exemplary combination of the lower film material and the upper film material is Cr and Al-Nd alloy.

In addition, the lateral sides of the gate lines 121 and the storage electrode lines 131 are tapered, and the inclination angle of the lateral sides with respect to a surface of the substrate 110 ranges about 20–80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated to "a-Si") are formed on the gate insulating layer 140. Each semiconductor stripe 151 extends substantially in the longitudinal direction and has a plurality of projections 154 branched out toward the gate electrodes 123. The width of each semiconductor stripe 151 becomes large near the gate lines 121 such that the semiconductor stripe 151 covers large areas of the gate lines 121.

A plurality of ohmic contact stripes and islands 161 and 165 preferably made of silicide or n+ hydrogenated a-Si heavily doped with n type impurity such as phosphorous are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are tapered, and the inclination angles thereof are preferably in a range between about 30–80 degrees.

A plurality of data lines 171, a plurality of drain electrodes 175 separated from the data lines 171, and a plurality of data metal pieces 172 separated from the data lines and the drain electrodes 175 are formed on the ohmic contacts 161 and 165 and the gate insulating layer 140.

The data lines 171 for transmitting data voltages extend substantially in the longitudinal direction and intersect the gate lines 121 and the storage electrode lines 131 as well as the electrode connections 133d. Each data line 171 is disposed between the first and the second storage electrodes 133a and 133b in adjacent sets of the branches 133a–133d of the storage electrode lines 131 and it includes an end portion 179 having wider width for contact with another layer or an external device. A plurality of branches of each data line 171, which project toward the drain electrodes 175, form a plurality of source electrodes 173. Each drain electrode 175 obliquely extends from a position near the source electrode 173 to have an end portion having a rectangular shape. The rectangular end portion has two edges making an angle of about 45 degrees with the gate lines 121 and the data lines 171. Each source electrode 173 is curved to partly enclose an end portion of the drain electrode 175. A gate electrode 123, a source electrode 173, and a drain electrode 175 along with a projection 154 of a semiconductor stripe 151 form a TFT having a channel formed in the projection 154 disposed between the source electrode 173 and the drain electrode 175.

The date metal pieces 172 are disposed on the gate lines 121 near the first storage electrodes 133a.

The data lines 171, the drain electrodes 175, and the data metal pieces 172 are preferably made of refractory metal such as Mo containing metal, Cr or Al containing metal and they may also include a lower film (not shown) preferably made of Mo, Mo alloy or Cr and an upper film (not shown) located thereon and preferably made of Al containing metal.

Like the gate lines 121 and the storage electrode lines 131, the data lines 171, the drain electrodes 175, and the data metal pieces 172 have tapered lateral sides, and the inclination angles thereof range about 30–80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175. Although the semiconductor stripes 151 are narrower than the data lines 171 at most places, the width of the semiconductor stripes 151 becomes large near the gate lines 121 as described above, to smooth the profile of the surface, thereby preventing the disconnection of the data lines 171.

A passivation layer 180 is formed on the data lines 171, the drain electrodes 175, and the exposed portions of the semiconductor stripes 151. The passivation layer 180 is preferably made of photosensitive organic material having a good flatness characteristic, low dielectric insulating material having dielectric constant lower than 4.0 such as a-Si:C:O and a-Si:O:F formed by plasma enhanced chemical vapor deposition (PECVD), or inorganic material such as silicon nitride.

The passivation layer 180 has a plurality of contact holes 181, 182 and 186 exposing the expansions of the drain electrodes 175, the data metal pieces 172, and the end portions 179 of the data lines 171, respectively. The passivation layer 180 and the gate insulating layer 140 have a plurality of contact holes 182, 183 and 185 exposing the free end portions of the first storage electrodes 133a, portions of the storage electrode lines 131 near the fixed end portions of the first storage electrodes 133a, and the end portions 125 of the gate lines 121, respectively. The contact holes 183 and 184 also expose portions of the substrate 110, but it is optional.

A plurality of pixel electrodes 190, a plurality of contact assistants 95 and 97, and a plurality of storage connections 91, which are preferably made of ITO or IZO, are formed on the passivation layer 180. However, they may be made of reflective metal when the LCD is a reflective LCD.

The pixel electrodes 190 are physically and electrically connected to the drain electrodes 175 through the contact holes 181 such that the pixel electrodes 190 receive the data voltages from the drain electrodes 175.

The pixel electrodes 190 supplied with the data voltages generate electric fields in cooperation with the common electrode 270, which reorient liquid crystal molecules in the liquid crystal layer 3.

A pixel electrode 190 and the common electrode 270 form a liquid crystal capacitor, which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the pixel electrodes 190 with the storage electrode lines 131 including the storage electrodes 133a–133c.

Each pixel electrode 190 is chamfered near both the end portions of the first storage electrode 133a and the chamfered edges of the pixel electrode 190 make an angle of about 45 degrees with the gate lines 121.

Each pixel electrode 190 has a transverse cutout 191 extending in the transverse direction and located at a position so as to partition the pixel electrode 190 into upper and lower halves arranged in the longitudinal direction, and a pair of oblique cutouts 192 and 193 extending in oblique directions and located respectively in the lower and the upper halves of the pixel electrodes 190. The cutouts 191–193 start from a right edge of the pixel electrode 190 and extend toward a left edge of the pixel electrode 190. The transverse cutout 191 ends near a center of the pixel electrode 190 and has a chamfered inlet. The oblique edges 192 and 193 ends near the left edge of the pixel electrode 190 and overlap the third and the fourth storage electrodes 133c and 133d. The extensions of the oblique cutouts 192 and 193 are perpendicular to each other in order for regularly distributing the field directions of the fringe fields into four directions. The oblique cutouts 192 and 193 are arranged symmetrical with respect to the transverse cutout 191. The oblique cutouts 192 and 193 make an angle of about 45 degrees to the gate lines 121.

Accordingly, the upper half of the pixel electrode 190 is partitioned into two upper partitions by the oblique cutout 193, and the lower half of the pixel electrode 190 is also partitioned into two lower partitions by the oblique cutouts 192. The number of partitions or the number of the cutouts is varied depending on the design factors such as the size of pixels, the ratio of the transverse edges and the longitudinal edges of the pixel electrodes, the type and characteristics of the liquid crystal layer 3, and so on.

The contact assistants 95 and 97 are connected to the end portions 125 of the gate lines 121 and the end portions 179 of the data lines 171 through the contact holes 185 and 186, respectively. The contact assistants 95 and 97 are not requisites but preferred to protect the end portions 125 and 179 and to complement the adhesiveness of the end portions 125 and 179 and external devices.

The storage connections (or storage bridges) 91 cross over the gate lines 121 and overlap the data metal pieces 172. The storage bridges 91 are connected to the exposed portions of the storage electrode lines 131 and the exposed end portions of the first storage electrodes 133a through the contact holes 183 and 184 opposite each other with respect to the gate lines 121, respectively.

The description of the common electrode panel 200 follows.

A black matrix 220 for preventing light leakage is formed on an insulating substrate 210 such as transparent glass and the black matrix 220 includes a plurality of openings facing the pixel electrodes 190 and having substantially the same shape as the pixel electrodes 190.

A plurality of red, green and blue color filters 230 are formed substantially in the openings of the black matrix 220 and an overcoat 250 is formed on the color filters 230.

A common electrode 270 preferably made of transparent conductive material such as ITO and IZO is formed on the overcoat 250.

The common electrode 270 has a plurality of sets of cutouts 271–273. Two adjacent cutouts 271, 272 and 273 of the common electrode 270 interpose the oblique cutouts 192 and 193 of the pixel electrode 190.

The cutouts 271, 272 and 273 of the reference electrode 270 opposite each other with respect to a boundary line between two adjacent pixel areas (i.e., a line extending along the data line) have substantially inversion symmetry with respect to the boundary line.

The common electrode 270 has a plurality of sets of cutouts 271–273. The cutouts 272 and 273 include oblique portions extending substantially parallel to the oblique cutouts 192 and 193 and transverse and longitudinal portions connected to ends of the oblique portions, overlapping the edges of the pixel electrodes 190, and making an obtuse angle with the oblique portions. The cutout 271 includes a pair of oblique portions meeting near the center of the pixel electrode 190, a central transverse portion extending from the meeting point to a longitudinal edge of the pixel electrode 190 with making an obtuse angle with the oblique portions, and a pair of terminal transverse portions extending from the ends of the oblique portions along the longitudinal edge of the pixel electrode 190 with making an obtuse angle with the oblique portions. The cutouts 271–273 are disposed between the cutouts 191–193 and the chamfered edges of the pixel electrode 190 and the distances between the oblique portions of adjacent cutouts 271–273 and 191–193 and the distances between the oblique portions of the cutouts 272 and 273 and the chamfered edges of the pixel electrode 190 are substantially the same.

A homeotropic alignment layer (not shown) is coated on the inner surface of each panel 100 or 200, and a pair of polarizers (not shown) are provided on outer surfaces of the panels 100 and 200 such that their polarization axes are crossed and one of the transmissive axes is parallel to the gate lines 121. One of the polarizers may be omitted when the LCD is a reflective LCD.

The LCD may further include at least one retardation film for compensating the retardation of the LC layer 3.

The LC molecules in the LC layer 3 are aligned such that their long axes are vertical to the surfaces of the panels 100 and 200. The liquid crystal layer 3 has negative dielectric anisotropy.

The cutouts 191–193 and 271–273 controls the tilt directions of the LC molecules in the LC layer 3. That is, the liquid crystal molecules in each region called domain defined by adjacent cutouts 191–193 and 271–273 or by the cutout 272 or 273 and the chamfered edge of the pixel electrode 190 are tilted in a direction perpendicular to the extension direction of the cutouts 191–193 and 271–273. It is apparent that the domains have two long edges extending substantially parallel to each other and making an angle of about 45 degrees with the gate line 121.

The expansions of the drain electrodes 175 are disposed near corners of the domains to block the light leakage or the texture generated near the corners due to the disorder of the orientations of the LC molecules.

In addition, an edge of the drain electrode 175 closest to a center of a domain is substantially perpendicular to the long edges of the domain, i.e., substantially parallel to the tilt direction of the LC molecules in the domain.

This configuration blocks the light leakage and the texture without decreasing the aperture ratio, thereby increasing contrast ratio.

The number of the upper cutouts 271a–275a or the lower cutouts 271b—271b is five, and it may be varied depending on the design factors.

While the present invention has been described in detail with reference to the preferred embodiments, those skilled in the art will appreciate that various modifications and substitutions can be made thereto without departing from the spirit and scope of the present invention as set forth in the appended claims.

For example, the arrangements of the cutouts of the pixel electrodes and the common electrode may be modified and protrusions are provided instead of the cutouts.

What is claimed is:

1. A liquid crystal display comprising:
   a first substrate;
   a gate line formed on the first substrate;
   a data line formed on the first substrate and intersecting the gate line;
   a pixel electrode disposed substantially in an area defined by the gate line and the data line;
   a thin film transistor including a gate electrode connected to the gate line, a source electrode connected to the data line, and a drain electrode connected to the pixel electrode;
   a second substrate facing the second substrate;
   a common electrode formed on the second substrate;
   a liquid crystal layer interposed between the first substrate and the second substrate;
   first and second domain defining members defining a plurality of domains in the liquid crystal layer,
   wherein the drain electrode is disposed near a corner of one of the domains;
   wherein each domain has a pair of major edges extending parallel to each other; and
   wherein the drain electrode has a plurality of edges and the edges of the drain electrode include a first edge extending perpendicular to the major edges of the domains and located closest to a center of the one of the domains.

2. The liquid crystal display of claim 1, wherein the major edges of the domains make an angle of about 45 degrees with the gate line.

3. The liquid crystal display of claim 1, wherein the drain electrode has a first edge perpendicular to the major edges of the one of the domains.

4. The liquid crystal display of claim 1, wherein the first and the second domain defining members include cutouts provided in the pixel electrode and the common electrode.

5. The liquid crystal display of claim 1, further comprising a storage electrode overlapping the first domain defining member.

* * * * *